United States Patent [19]

Fenner et al.

[11] Patent Number: 4,780,043

[45] Date of Patent: Oct. 25, 1988

[54] MODULAR CARGO LOADING AND UNLOADING SYSTEM

[75] Inventors: James A. Fenner, Renton; Eugene N. Martin, Kent; Frederick C. Mitchell, Auburn; Thomas E. A. H. Webb, Bellevue, all of Wash.

[73] Assignee: The Boeing Company, Seattle, Wash.

[21] Appl. No.: 917,161

[22] Filed: Oct. 9, 1986

[51] Int. Cl.⁴ .............................................. B64C 1/22
[52] U.S. Cl. ............................ 414/502; 198/316.1; 198/854; 198/372; 198/457; 198/463.3; 244/137.1; 414/523; 414/532
[58] Field of Search ........... 198/372, 457, 854, 463.3, 198/597, 809; 414/345, 343, 532, 502, 503, 505, 500, 501, 523; 192/1; 244/137.1

[56] References Cited

U.S. PATENT DOCUMENTS

| | | |
|---|---|---|
| 1,603,634 | 10/1926 | Nelson . |
| 1,716,101 | 6/1929 | Biggs . |
| 2,460,017 | 1/1949 | Lautrup et al. ................. 198/854 X |
| 2,681,130 | 6/1954 | Atwood . |
| 3,282,456 | 11/1966 | Hawes . |
| 3,337,022 | 8/1967 | Merry . |
| 3,356,236 | 12/1967 | Shaw et al. . |
| 3,493,095 | 2/1970 | Messerly . |
| 3,522,919 | 8/1970 | Bader . |
| 3,550,753 | 12/1970 | Culp . |
| 3,612,316 | 10/1971 | Baldwin et al. . |
| 3,620,353 | 11/1971 | Foster et al. . |
| 3,624,782 | 11/1971 | McPeek et al. . |
| 3,741,504 | 6/1973 | Alberti et al. . |
| 3,777,916 | 12/1973 | Lutz . |
| 3,799,479 | 3/1974 | Roeder et al. . |
| 3,822,777 | 7/1974 | Jepsen . |
| 3,861,541 | 1/1975 | Taft et al. . |
| 3,885,685 | 5/1975 | Montgomery et al. . |
| 3,899,092 | 8/1975 | Nordstrom . |
| 3,934,707 | 1/1976 | Bowman . |
| 4,000,870 | 1/1977 | Davies . |
| 4,050,655 | 9/1977 | Bogue et al. . |
| 4,146,126 | 3/1979 | Mattos . |
| 4,149,626 | 4/1979 | Holt . |
| 4,236,631 | 12/1980 | Bowen et al. . |
| 4,544,319 | 10/1985 | Folling et al. . |
| 4,572,356 | 2/1986 | Janick ............................ 198/854 X |

FOREIGN PATENT DOCUMENTS 2728016 1/1979 Fed. Rep. of Germany .

Primary Examiner—Frank E. Werner
Attorney, Agent, or Firm—Christensen, O'Connor, Johnson & Kindness

[57] ABSTRACT

A modular cargo loading and unloading system for installation in the lower lobe compartment of an aircraft is disclosed. The system includes a doorway transfer unit (17) and a plurality of longitudinal units (19). Each of the units includes conveyor belts for supporting and moving cargo containers. The doorway transfer unit (19) includes perpendicular conveyor belts (35, 37) that are selectively raised, lowered and powered to change the direction of cargo container movement at the entryway of the lower lobe compartment. The longitudinal units (19) include powered belts (51) that move the cargo containers to and from their destinations in the lower lobe compartment. A quick-change mechanism that attaches the modular units to the cargo tie-down receptacles located in the deck of the lower lobe compartment allows the units to be quickly installed and removed.

7 Claims, 6 Drawing Sheets

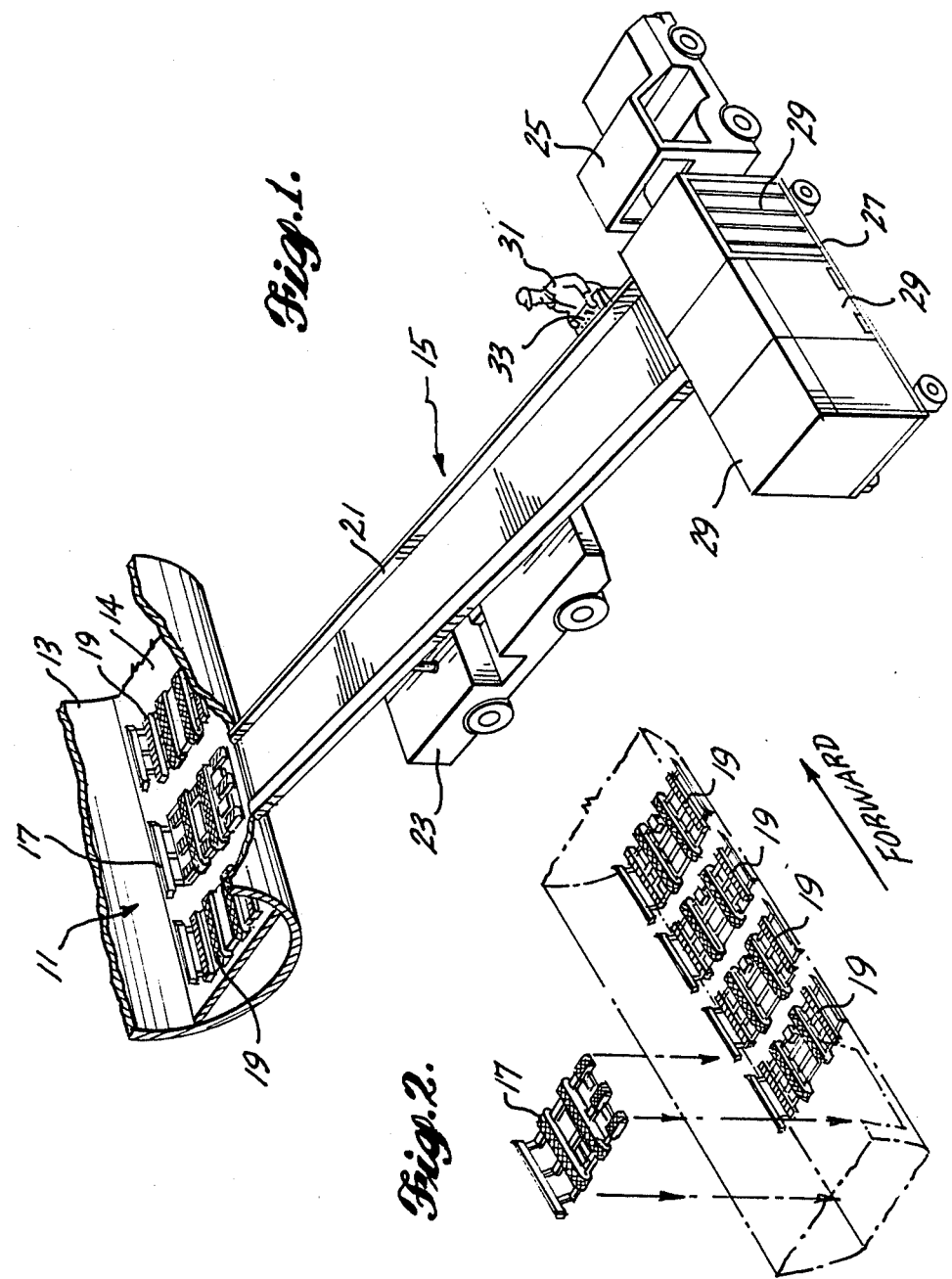

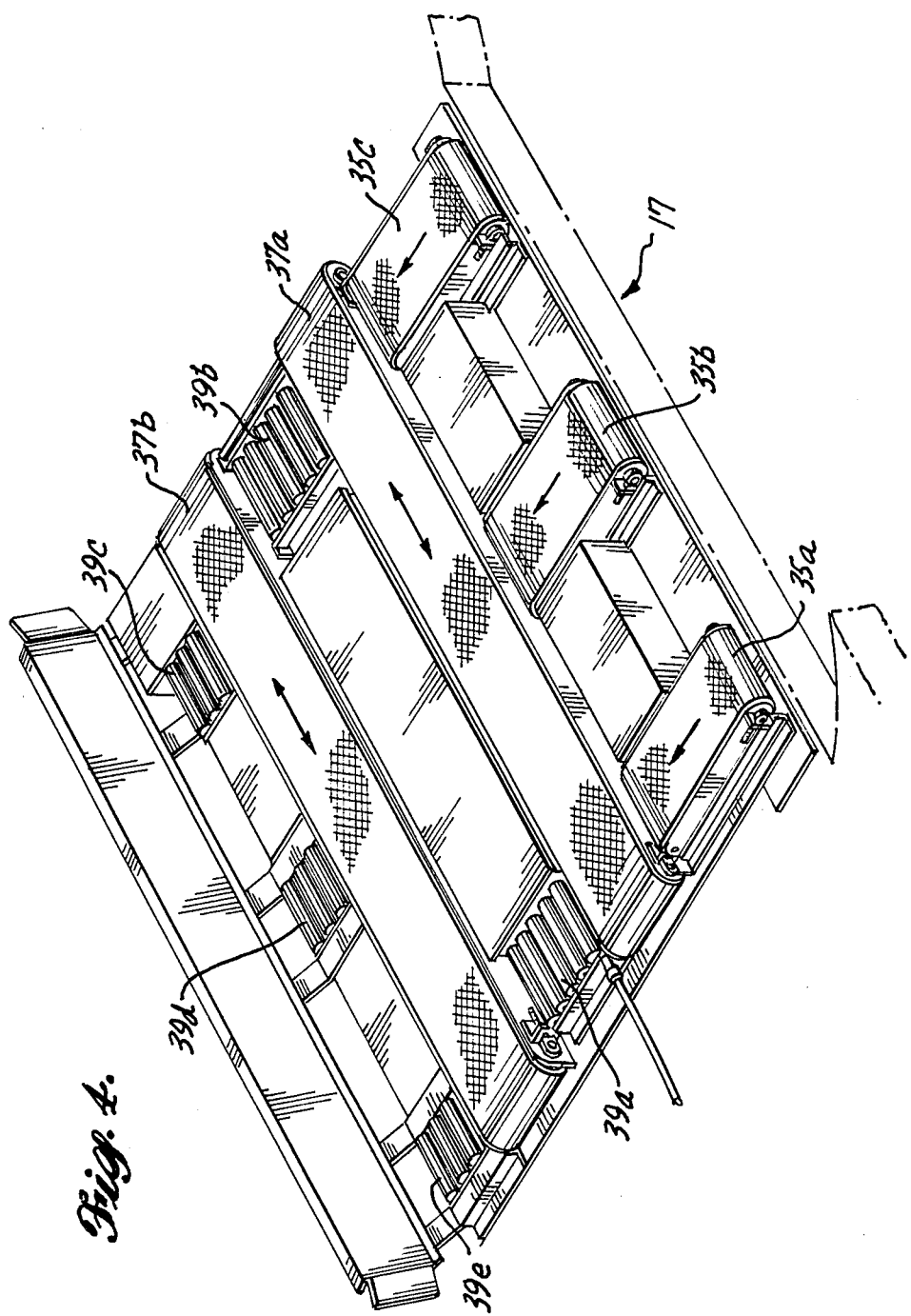

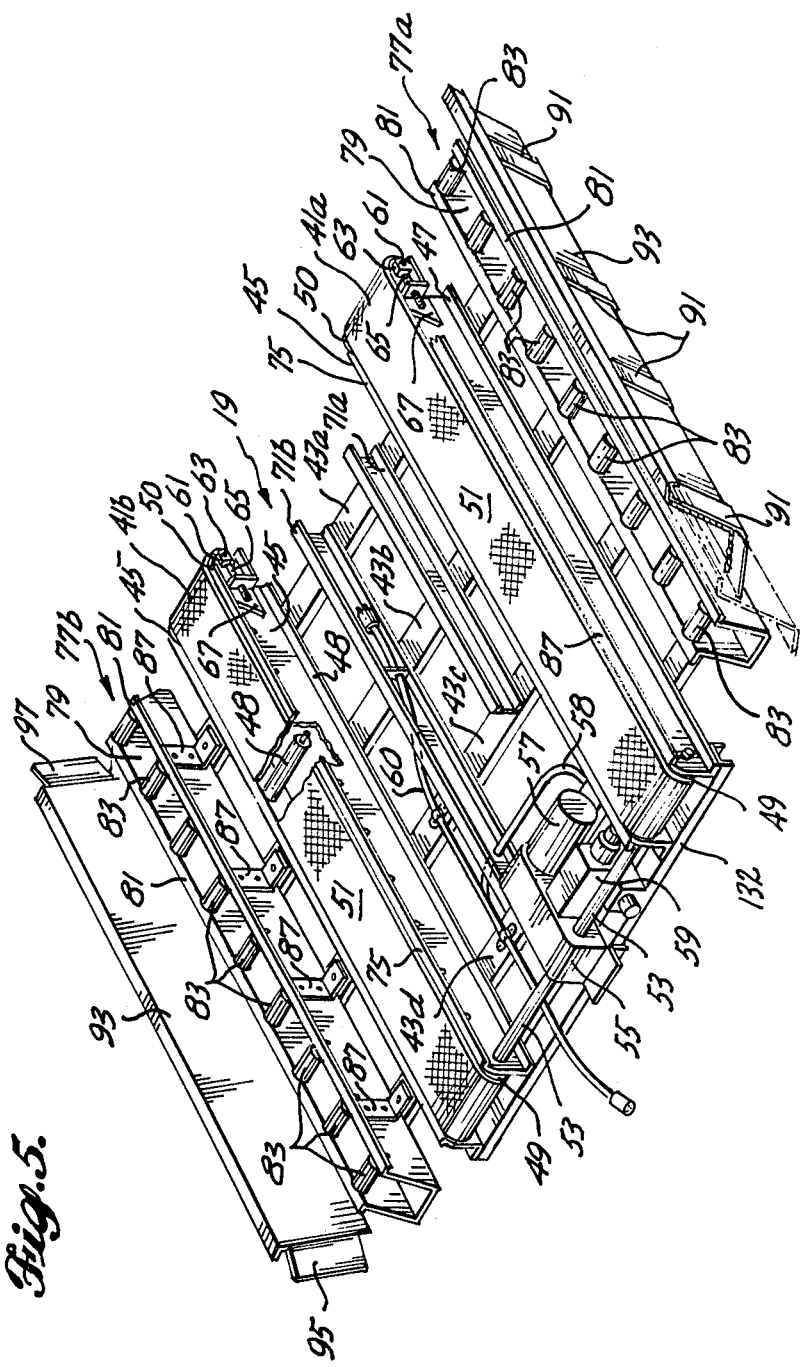

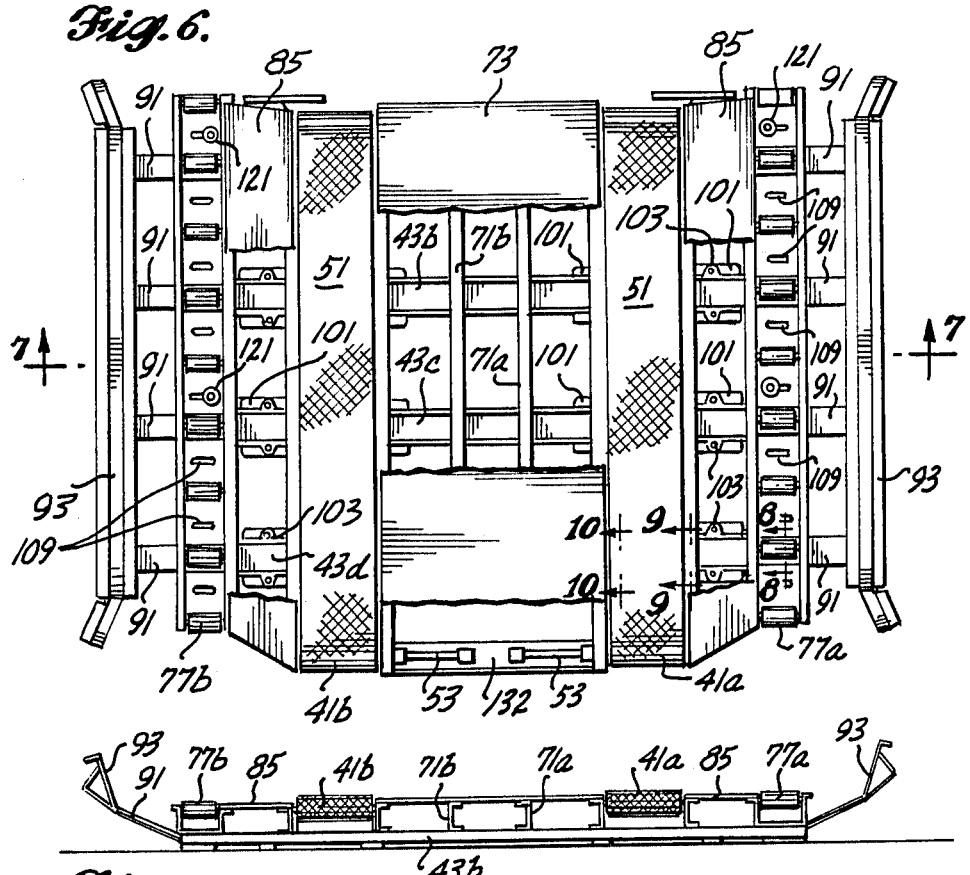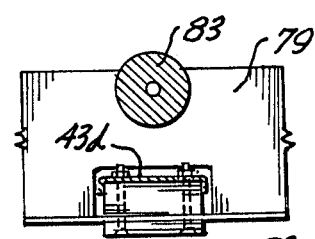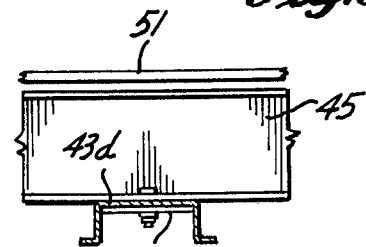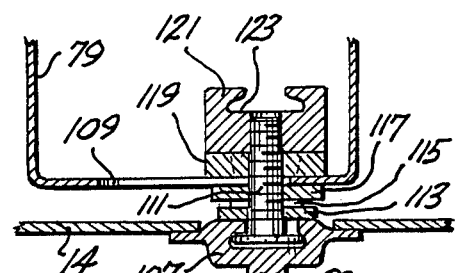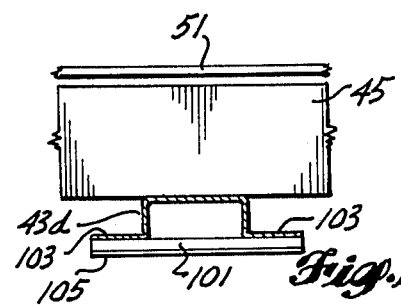

MODULAR CARGO LOADING AND UNLOADING SYSTEM

TECHNICAL AREA

This invention relates to cargo loading and unloading systems and, more particularly, cargo loading and unloading systems for loading and unloading cargo in relatively confined areas, such as the lower lobe compartment of an aircraft.

BACKGROUND OF THE INVENTION

While the present invention was developed for use in moving cargo containers to and from the lower lobe compartment of an aircraft, and is described in this environment, it is to be understood that the invention can be used in other confined, elongate environments to load and unload cargo.

While cargo loading and unloading systems have been developed for loading the lower lobe compartment of wide body aircraft, traditionally, the lower lobe compartments of standard sized aircraft have been bulk loaded. That is, in the past, the lower lobe compartments of standard sized aircraft have been loaded by manually stacking cargo and baggage in the compartment. Manual loading has the disadvantage of limiting the size of baggage to those items that can be manhandled. Further, because manual loading is time consuming, it limits aircraft turnaround time.

While, in the past, some lower lobe cargo loading and unloading systems have been proposed and implemented in standard sized aircraft, for various reasons such systems have not been satisfactory. Some prior lower lobe cargo loading and unloading systems have been custom designed for compatibility with specialized containers and aircraft configurations, making them unsuitable for widespread use. Many prior systems have been permanently installed in aircraft, or installed in such a manner that installation and removal is a time consuming job. Such systems do not allow a lower lobe compartment to be rapidly and quickly converted between a compartment containing a cargo loading system and a compartment that does not contain a cargo loading system. Such prior lower lobe cargo loading and unloading systems have simply consisted of balls and rollers located at the conveyor plane and guides and stops positioned to restrain the containers after they have been moved to a storage position. While such systems allow larger containers to be moved and positioned than those that can be manually lifted, positioning of the containers is still, primarily, the result of manual labor.

Modules for carrying cargo and/or baggage are being developed. Such modules have a right rectangular, parallepiped configuration, i.e., all sides are generally rectangular and are sized for compatibility with trucks, railcars, shipping pallets, and the like. In general, such modules are not compatible with previously developed, specialized aircraft lower lobe container loading and unloading systems. Further, the cardboard construction of some such modules makes then noncompatible with conveyor systems composed of balls and rollers.

As a result, there is a need for a lower lobe cargo loading and unloading system for standard sized aircraft that is generally universal, i.e., can be utilized in a wide variety of such aircraft. There is also a need for a lower lobe cargo loading and unloading system that can be quickly and rapidly installed so that the lower lobe of an aircraft can be converted from a compartment that does not contain a cargo loading and unloading system to one that does contain a cargo loading and unloading system and vice versa, in order to change an aircraft configuration from one designed to function in a particular environment to one designed to function in a different environment. Further, there is a need for a lower lobe cargo loading and unloading system that is compatible with cargo containers formed of cardboard. The invention is directed to providing a cargo loading system that meets these requirements.

SUMMARY OF THE INVENTION

In accordance with this invention, a cargo loading and unloading system comprising a plurality of modular units is provided. The modular units are designed to be installed in an elongate compartment having a side entry, such as the lower lobe compartment of a standard sized aircraft. The modular units include a doorway transfer unit and a plurality of longitudinal units. the doorway transfer unit is mounted in the entryway of the compartment and orthogonally changes the direction of movement of cargo containers entering and leaving the compartment. The longitudinal units are serially positioned in the compartment and move cargo containers to and from their destinations in the compartment. Both the doorway transfer unit and the longitudinal units include cargo supporting conveyor belts.

In accordance with other aspects of this invention, a quick change tie-down mechanism is used to attach the modular units to the deck of the compartment so that the units can be quickly installed and removed.

In accordance with further aspects of this invention, the doorway transfer unit includes powered lateral conveyor belts and powered longitudinal conveyor belts. The lateral conveyor belts move cargo to and from a position above the longitudinal conveyor belts, which are raisable and lowerable. The longitudinal conveyor belts move cargo to and from an adjacent longitudinal unit.

In accordance with still other aspects of this invention, the longitudinal units also include powered conveyor belts. The conveyor belts of the longitudinal units are aligned with one another.

As will be readily appreciated from the foregoing description, the invention provides a modular cargo loading and unloading system ideally suited for loading cargo into and removing cargo from the lower lobe compartment of a standard sized aircraft. The quick change tie-down mechanism used to attach the modular units to the deck of the lower lobe compartment, preferably using cargo tie-down receptacles located in the deck, allows the units to be quickly installed and removed. This allows an aircraft to be readily converted from one configuration to another configuration. Because the cargo loading and unloading system is modular, it can be sized such that each of the modular units can be picked up and removed by two installers. Further, the use of conveyor belts makes the units compatible with containers formed of cardboard. Finally, the inclusion of an entryway unit designed to perpendicularly change the direction of cargo as cargo is loaded and unloaded maximizes the container storage capacity of the lower lobe compartment.

BRIEF DESCRIPTION OF THE DRAWINGS

The foregoing and other features and advantages of the present invention will become more readily appreciated as the same become better understood by reference to the following detailed description, when taken in conjunction with the accompanying drawings, wherein:

FIG. 1 is a pictorial view of a portion of a modular cargo loading and unloading system formed in accordance with the invention aligned with conventional cargo loading and unloading ground transport equipment;

FIG. 2 is a pictorial view of a modular cargo loading and unloading system formed in accordance with the invention;

FIG. 4 is a pictorial view of a doorway transfer unit that forms part of the modular belt cargo loading system illustrated in FIGS. 1-3;

FIG. 5 is a pictorial view of a longitudinal unit that forms part of the modular belt cargo loading system illustrated in FIGS. 1-3;

FIG. 6 is a plan view of the longitudinal unit illustrated in FIG. 5;

FIG. 7 is a cross-sectional view along line 7—7 of FIG. 6;

FIG. 8 is a cross-sectional view along line 8—8 of FIG. 6;

FIG. 9 is a cross-sectional view along line 9—9 of FIG. 6;

FIG. 10 is a cross-sectional view along line 10—10 of FIG. 6;

FIG. 11 is a cross-sectional view illustrating the mechanism for attaching the doorway transfer and longitudinal units illustrated in FIGS. 4 and 5 to the cargo tie-down receptacles located in the deck of the cargo compartment of an aircraft;

DESCRIPTION OF THE PREFERRED EMBODIMENT

Figure 3:
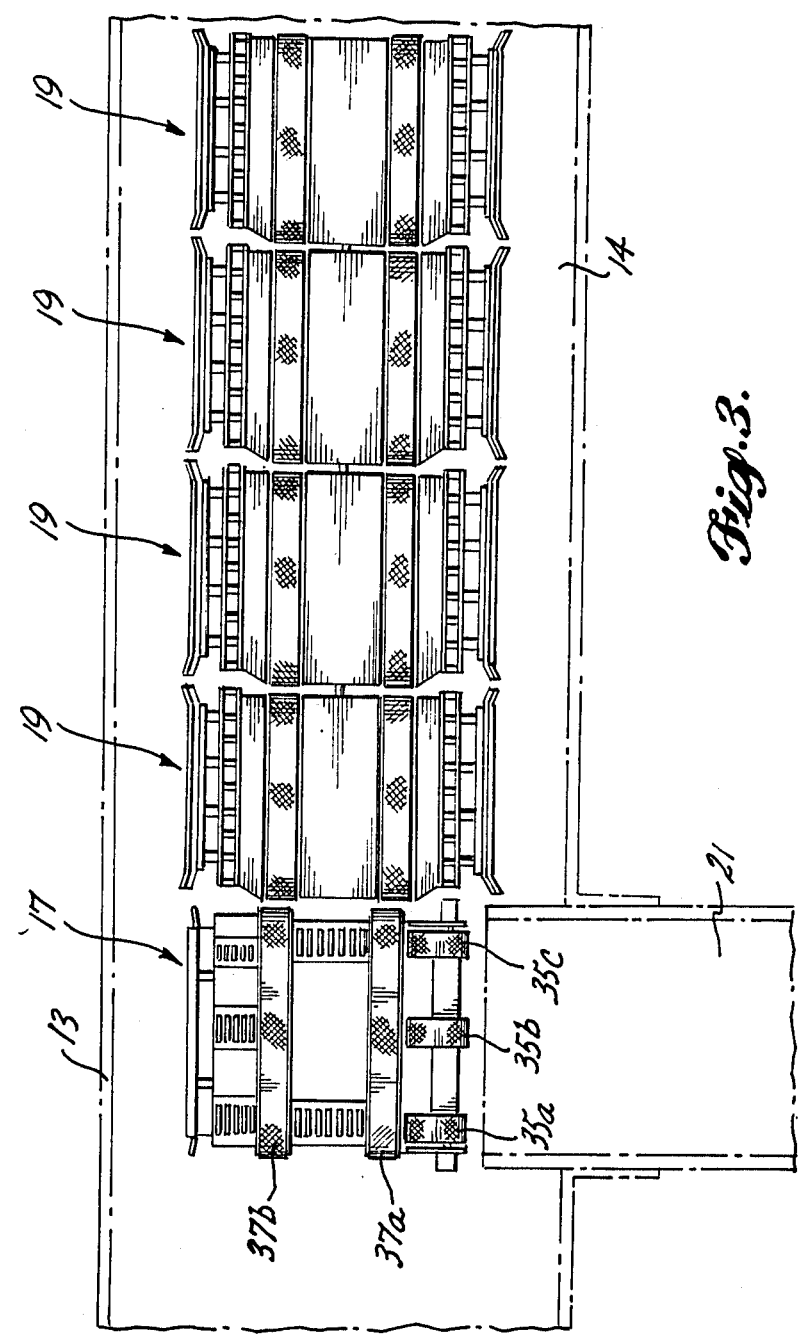
FIG. 3 is a plan view of a modular cargo loading and unloading system formed in accordance with the invention.

As illustrated in FIG. 1, preferably, a modular cargo loading and unloading system 11 formed in accordance with the invention is mounted in the lower lobe compartment of an aircraft 13 and used with conventional ground transportation equipment 15. While the aircraft 13 can be a wide body aircraft, the invention was designed for use in the lower lobe compartment of standard sized aircraft such as the Boeing 727 and 757 aircraft. The modular cargo loading and unloading system is formed of a plurality of modules or units including: a doorway transfer unit 17 positioned adjacent the cargo doorway of the lower lobe compartment of the aircraft 13; and several longitudinal units 19.

As illustrated in FIG. 1, the doorway transfer unit 17 receives cargo from, and delivers cargo to, a conventional ground equipment belt conveyor 21 that is mounted atop a vehicle 23 and positioned to provde an inclined ramp between the cargo doorway of the aircraft 13 and the ground. Another vehicle 25, pulling one or more trailers 27, delivers cargo containers 29 to, and/or receives cargo containers from, the ground end of the ground equipment belt conveyor 21. An operator 31, via a control console 33, controls the operation of the ground equipment belt conveyor 21 and, thus, the transfer of cargo between the lower lobe compartment of the aircraft 13 and the trailer(s) 27.

As illustrated in FIGS. 1-3, the longitudinal units 19 are serially positioned on one or both sides of the doorway transfer unit 17 and lie atop the deck 14 of the lower lobe compartment of the aircraft 13, parallel to the longitudinal axis of the aircraft. The doorway transfer unit is designed to transfer cargo between the ground equipment belt conveyor 21 and adjacent longitudinal units 19 during loading and unloading. Since the ground equipment belt conveyor lies perpendicular to the longitudinal axis of the aircraft, the doorway transfer unit 17 changes the direction of movement of cargo containers by 90 degrees.

A doorway transfer unit that was designed for use in the embodiment of a modular cargo loading system, formed in accordance with the invention and described herein, is illustrated and described in U.S. patent application Ser. No. 811,360 entitled "Lower Lobe Cargo Transfer Platform Conveyor System", filed Dec. 20, 1985 by James A. Fenner, which is incorporated herein by reference. Since patent application Ser. No. 811,360 describes the details of a suitable doorway transfer unit, only enough of the doorway transfer unit necessary to understand the operation of the modular cargo loading system that forms the present invention is described here.

The doorway transfer unit is best illustrated in FIG. 4 and includes three spaced-apart lateral conveyors 35a, 35b, and 35c located along the edge of the doorway transfer unit 17 that faces the belt conveyor 21 of the ground transportation equipment. The lateral conveyors include conveyor belts powered by a suitable power source. The axis of movement of the lateral conveyor belts lies perpendicular to the longitudinal axis of the aircraft, i.e, in the same direction as the ground equipment belt conveyor 21. Thus, the lateral conveyors receive cargo from and deliver cargo to the ground equipment belt conveyor 21.

During loading, the lateral conveyors 35a, 35b, and 35c move cargo containers to a position above a pair of spaced-apart longitudinal conveyors 37a and 37b, which lie inboard of the lateral conveyors 35a, 35b, and 35c. The longitudinal conveyors 37a and 37b included conveyor belts powered by a suitable power source. The axis of movement of the longitudinal conveyor belts lies parallel to the longitudinal axis of the aircraft 13. Thus, the direction of movement of the longitudinal conveyors 37a and 37b lies perpendicular to the direction of movement of the lateral conveyors 35a, 35b, and 35c.

As noted above, during loading, the lateral conveyors 35a, 35b and 35c move cargo containers to a position above the longitudinal conveyors 37a and 37b. Support for the containers is provided by sets of rollers 39a, 39b, 39c, 39d and 39e located between the longitudinal conveyors 37a and 37b and on the side of the longitudinal conveyors remote from the lateral conveyors 35a, 35b and 35c.

After a cargo container is positioned above the longitudinal conveyors 37a and 37b, the lateral conveyors 35a, 35b, and 35c are deenergized. Thereafter, the longitudinal conveyors are raised. Raising of the longitudinal conveyors 37a and 37b lifts the cargo container above the lateral conveyors 35a, 35b, and 35c and above the sets of rollers 39a, 39b, 39c, 39d and 39e. The containers are raised to the conveyor level of the longitudinal units 19, which are described in detail below. The longitudinal conveyors 37a and 37b then move the cargo containers onto conveyor belts that form part of the longitudinal units. The longitudinal units move the cargo containers to their final destinations in the lower lobe compartment of the aircraft 13.

After a cargo container is picked up by the adjacent longitudinal unit and leaves the doorway transfer unit 17, the longitudinal conveyors 37a and 37b are lowered. Thereafter, another cargo container is moved by the lateral conveyors 35a, 35b and 35c from the ground equipment belt conveyor 21 to a position above the longitudinal conveyors 37a and 37b of the doorway transfer unit 17.

During unloading, a cargo container is first moved by the conveyors of the longitudinal units 19 to the previously raised longitudinal conveyors 37a and 37b, which move the cargo container to be unloaded to a position above the lateral conveyors 35a, 35b, and 35c and the sets of rollers 39a, 39b, 39c, 39d and 39e. Then the longitudinal conveyors 37a and 37b are deenergized and lowered, and the lateral conveyors 35a, 35b, and 35c are energized to move the cargo container through the entryway of the lower lobe compartment to the ground equipment belt conveyor 21.

As illustrated best in FIGS. 5-7, each of the longitudinal units 19 includes a pair of spaced-apart conveyors 41a and 41b. As noted above, the longitudinal units 19 are located side-by-side in seriatim on the deck of the lower lobe compartment of an aircraft. When correctly oriented, the axis of movement of the spaced-apart belt conveyors 41a and 41b of the longitudinal units lies parallel to the longitudinal axis of the lower lobe compartment. Preferably, the conveyors 41a and 41b of the longitudinal units 19 are positioned so as to be generally alignable with the longitudinal conveyors 37a and 37b of the doorway transfer units 17.

The conveyors 41a and 41b of the longitudinal units are mounted atop a plurality of inverted U-shaped frame members 43a, 43b, 43c, and 43d. More specifically, each of the longitudinal conveyors 41a and 41b includes a pair of spaced-apart parallel-oriented elongate frame elements 45. Preferably, the frame elements have a C-shaped configuration and are oriented back-to-back. The lower flanges 47 of the frame elements are mounted atop the U-shaped frame members 43a, 43b, 43c, and 43d so as to lie perpendicular thereto. Extending between the spaced-apart frame elements 45 of the conveyors 41a and 41b of the longitudinal units 19 are a plurality of support rollers 48, a drive roller 49 and an idler roller 50, which support belts 51.

Connected to the drive rollers 49 located on one end of the longitudinal unit conveyors 41a and 41b, and extending inwardly therefrom are shafts 53. The shafts 53 are connected to the ends of the output shaft of a gearbox 55. The input shaft of the gearbox 55 is connected to the output shaft of an electric motor 57.

Energization of the motor 57 is controlled by the opening and closing of relays mounted in a relay control box 59. Control signals for the relay control box 59 and power for the motor are received via a short cable 58 that joins a coupling cable 60 that connects together adjacent longitudinal units 19. When the electric motor 57 is energized, the gearbox 55 transfers motor shaft rotation to the shafts 53 and, thus, to the drive rollers 49 of the longitudinal unit conveyors 41a and 41b, causing the belts 51 of the conveyors to move. The direction of motor rotation and, thus, the direction of belt 51 movement is determined by the state of relays in the relay control box 59. The state of the control relays is controlled by the nature of the control signals conveyed by the short and coupling cables 58 and 60.

Located at the other end of the conveyors 41a and 41b of the longitudinal units 19 are belt-tightening mechanisms 61. The belt-tightening mechanisms are similar to those described in U.S. patent application Ser. No. 811,360 referenced above. In essence, the belt-tightening mechanisms comprise mounting the idler roller 50 located on the belt-tightener end of the conveyors 41a and 41b on a shaft journalled in blocks 63 that are mounted on the ends of rods 65. The rods 65, in turn, are mounted in brackets 67 attached to the outer surface of the frame elements 45, such that the rods lie parallel to the axis of movement of the belts 51. Longitudinal movement of the rods 65 in one direction or the other moves the block 63 back and forth, resulting in the belt 51 being loosened and tightened.

Orthogonally oriented, C-shaped, bracing bars 71a and 71b are mounted atop the U-shaped frame members 43a, 43b, 43c, and 43d, between the longitudinal unit conveyors 41a and 41b. A center cover plate 73 covers the region between the conveyors. More specifically, the center cover plate 73 is attached to the upper flanges 75 of the frame elements 45 of the conveyors 41a and 41b that face one another and to the upper flanges of the bracing bars 71a and 71b. The center cover plate lies above and covers the conveyor drive elements, i.e., the gearbox 55 and the motor 57 as well as the open space between the conveyors 41a and 41b. In order for gear drive and other elements to be seen, the center cover plate 73 is not illustrated in FIG. 5.

Also mounted on the upper surface of the U-shaped frame members 43a-43d are two roller assemblies 77a and 77b. One of the roller assemblies is spaced outwardly from the outer edge of each of the longitudinal conveyors 41a and 41b. Each of the roller assemblies 77a and 77b includes a deep U-shaped channel 79 having outwardly extending flanges 81. The deep U-shaped channels 79 lie parallel to the longitudinal axis of the longitudinal conveyors 41a and 41b.

Perpendicularly mounted between the legs of the deep U-shaped channels 79 are a plurality of rollers 83. The depth of the deep U-shaped channel 79 is such that the upper periphery of the rollers 73 lies slightly lower than the upper surface of the belts 51 of the longitudinal unit conveyors 41a and 41b.

Outer cover plates 85 (FIG. 6) cover the space between each longitudinal unit conveyor 41a and 41b and its related roller assembly 77a and 77b. The outer cover plates 85 are attached to the upper flanges 87 of the frame elements of the longitudinal unit conveyors 41a and 41b and to the upper surfaces of the flanges 81 located on the sides of the deep U-shaped channel 79 that face the longitudinal unit conveyors 41a and 41b. As with the center cover plate, the outer cover plates are not illustrated in FIG. 5 so that the various components covered by the outer cover plates can be seen. If desired, the rigidity of the deep U-shaped channels 79 can be improved by connecting one leg of L-shaped brackets 87 to the outer surface of the inner legs of the deep U-shaped channels 79 and the other leg of the L-shaped brackets to the upper surface of the U-shaped frame members 43a, 43b, 43c, and 43d, as illustrated in FIG. 5.

Attached to the bottom of the cross leg of the U-shaped frame members 43a–43d, at either end thereof is a bar 91. As best illustrated in FIG. 7, the bars include intermediate sections that diverge upwardly and outwardly, and almost vertical end sections. The end sections support side panels 93. Thus, the side panels 93 diverge slightly with respect to the plane defined by the longitudinal unit conveyor belts 51. The side panels 93 include leading and trailing edge flanges 95 and 97 that diverge outwardly. The side panels 93 provide lateral guidance for containers moved by the longitudinal unit conveyors 41a and 41b.

As best shown in FIGS. 6 and 10, wide support pads 101 are positioned at spaced-apart locations along the length of the U-shaped frame members 43a–43d. The wide support pads 101 are located beneath flanges 103 that protrude outwardly from the lower edges of the vertical legs of the inverted U-shaped frame members 43a–43d. Bolts or rivets may be used to attach the pads 101 to the protruding flanges 103. The pads 101 lie atop the deck 14 of the lower lobe compartment of an aircraft 13 when the units of a modular cargo loading system formed in accordance with the invention are positioned in the lower lobe compartment in the manner illustrated in FIGS. 1–3 and previously described.

When suitably positioned in a lower lobe compartment, the longitudinal units 19 and the doorway transfer unit 17 are attached to cargo tie-down receptacles 107 mounted in the deck 14 of the lower lobe compartment. FIG. 8 illustrates the attachment mechanism used with a longitudinal unit 19. In this regard, the horizontal cross leg of the deep U-shaped channels 79 of the roller assemblies 77a and 77b includes a plurality of spaced-apart, elongate slots 109. The longitudinal axes of the slots lie perpendicular to the longitudinal axes of the deep U-shaped channels 79. The slots are spaced to allow the longitudinal units to be mounted at various incrementally spaced positions along the length of the lower lobe compartment deck 24. The close slot spacing allows adjacent longitudinal units to be spaced close to one another. Close longitudinal unit spacing prevents cargo containers from becoming lodged between the longitudinal units. Longitudinal slots rather than holes are used to accommodate variations in baseline location of the cargo tie-down receptacles 107 to which the doorway transfer and longitudinal transfer and longitudinal units 17 and 19 are attached.

When in position, at least two elongate slots on either side of a longitudinal unit 19 are aligned with a cargo tie-down receptacle 107. The longitudinal units are attached to the cargo tie-down receptacles 107 via the aligned slots 109 using a suitable attachment mechanism. One suitable attachment mechanism is described in United States patent application Ser. No. 802,868 entitled "Chicago Tie-Down System", filed Nov. 27, 1985 by James A. Fenner, which is incorporated herein by reference. A cross-sectional view of a slightly modified version of such an attachment mechanism is shown in FIG. 11. As illustrated, the attachment mechanism described in U.S. patent application Ser. No. 802,868 comprises a bolt 111 whose flat head fits into the cargo tie-down receptacle 107. In this regard, preferably, the cargo tie-down receptacle 107 includes a cavity having a figure-eight shape when viewed from above. The head of the bolt is dropped into one of the enlarged ends of the cavity and slid to the center of the cavity whereat inwardly projecting protrusions prevent the head of the bolt 111 from being removed from the cavity when pulled vertically. The bolt is held in place in the center of the cavity by a retainer 113. The retainer ring includes two arcuately-shaped lower protrusions that lie in the cavity on either side of the inwardly projecting protrusions. Mounted atop the retainer 113 is a flat spacer 115. Threaded onto the bolt 111 above the spacer 115 is a nut 117. The slots 109 are positioned atop the nut 117. Mounted on the bolt, above the slot 109 is a thick washer 119. Threaded onto the bolt, above the thick washer 119, is a tie down nut 121, which includes a slot 123 designed to receive an appropriately shaped tool.

While the attachment mechanism illustrated in FIG. 11 and described above is ideally suited for use in attaching doorway transfer and longitudinal units 17 and 19, formed in accordance with the invention, to the deck 14 of the lower lobe compartment of an aircraft 13, it is to be understood that other attachment mechanisms can also be utilized, particularly in aircraft having a different type of tie-down bracket.

In accordance with the invention, preferably, the longitudinal units are connected together via the coupling cables 60. As cargo is being loaded, the longitudinal units can be sequentially deenergized as they become filled with cargo. During unloading, the longitudinal units can be sequentially energized as cargo is removed. Alternatively, and preferably in many instances, a first container can be moved into the aircraft via the doorway transfer unit 17 and onto the first adjacent longitudinal unit 19. Then a second container is moved onto the doorway transfer unit. Next, the second container is moved to the first adjacent longitudinal unit while the first container is moved to the next adjacent longitudinal unit. The procedure is continued until the entire compartment is loaded, and reversed during unloading.

Figures 12, 13:
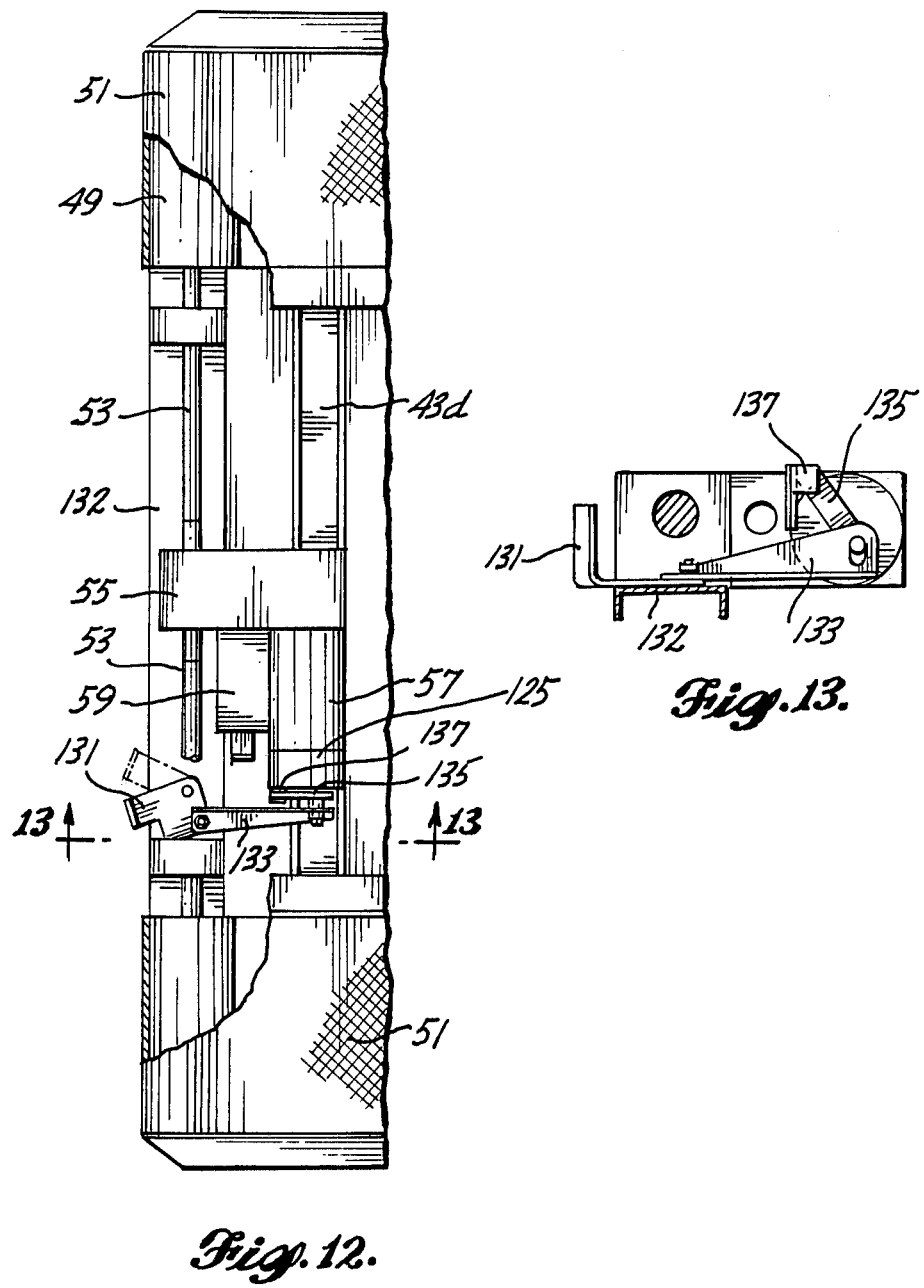
FIG. 12 is an enlarged plan view of a portion of the longitudinal unit illustrated in FIGS. 5-7.
FIG. 13 is a cross-sectional view along line 13—13 of FIG. 12.

When the electrical motor 57 of the longitudinal units are deenergized, a brake 125 that prevents movement of the belts 51 of the longitudinal unit conveyors 41a and 41b is engaged. In order to overcome the cargo moving difficulty that could occur due to the brake 125 of a failed motor remaining engaged, the invention includes a mechanism for manually releasing the brakes 125 of the motors 57 and allowing the belts to freely move as cargo is manually pulled across a longitudinal unit. The release brake mechanism is illustrated in FIGS. 12 and 13 and includes an L-shaped actuating arm 131 mounted on a frame element 132 located at the motor end of the longitudinal units 19 nearest the entryway. One leg of the L-shaped actuating arm 131 is vertical and the other leg is pivotally attached to the frame element 132. Rotatably attached to the leg of the L-shaped actuating arm 131 that is rotatably attached to the frame element 132, spaced from the point of rotation, is one end of a long link 133. The other end of the long link 133 is rotatably connected to one end of a short link 135 that is located at one end of the motor 57. The other end of the short link 135 is mounted in a yoke 137. Movement of the L-shaped actuating arm 131 causes the long link 133 to be moved back and forth. This movement causes movement of the short link 135 resulting in a manual release of the brake 125 of the motor 57.

As will be readily appreciated from the foregoing description, the invention provides a modular cargo loading and unloading system that is ideally suited for use in the lower lobe compartment of an aircraft. The modular cargo loading and unloading system includes a doorway transfer unit for each doorway of the lower lobe compartment. The doorway transfer unit(s) change the direction of cargo container movement by 90 degrees. As a result, cargo entering the doorway in a direction orthogonal to the longitudinal axis of the aircraft is redirected along the longitudinal axis of the aircraft during loading and vice versa during unloading. The longitudinal units move cargo containers from the doorway to their ultimate position in the aircraft during loading and from the interior of the aircraft to the doorway during unloading. The transfer unit can be separately energized to make loading and unloading easily controllable. Further, the units are easily installed and removed. Hence, the lower lobe compartment can be readily reconfigured, as needed. In this regard, preferably the units are sized so that they can be easily lifted and moved by two installers.

While a preferred embodiment of the invention has been illustrated and described, it is to be understood that within the scope of the appended claims various changes can be made therein. Consequently, the invention can be practiced otherwise than as specifically described herein.

The embodiments of the invention in which an exclusive property or privilege is claimed are defined as follows:

1. A modular cargo loading and unloading system for use in an elongate compartment, such as the lower lobe compartment of an aircraft, comprising:
    at least one removable doorway transfer unit including perpendicular conveyors for perpendicularly changing the direction of cargo movement at the entryway of an elongate compartment during cargo loading and unloading;
    a plurality of removable longitudinal units including belt conveyors for moving cargo between said doorway transfer unit and transportation positions in said elongate compartment, each of said plurality of longitudinal units including a pair of spaced apart belt conveyors and power means for powering said pair of spaced apart belt conveyors, said power means including electric motors having brakes that are engaged when said electric motors are de-energized to prevent the belt conveyors and cargo thereon from moving an brake release means for manually releasing the brakes of said electric motors to permit the belt conveyors and cargo thereon to be manually moved;
    tie-down means for attaching said doorway transfer and longitudinal units to the floor of said elongate compartment.

2. A modular cargo loading and unloading system as claimed in claim 1 wherein said tie-down means attach said doorway transfer and longitudinal units to cargo tie-down receptacles located in the floor of said elongate compartment.

3. A modular cargo loading and unloading system as claimed in claim 2 wherein said pair of spaced apart belt conveyors of said longitudinal units lie parallel to one another such that said conveyors have inner edges that face one another and outer edges that face away from one another and wherein each of said longitudinal units includes roller means located along the outer edges of said pair of spaced apart belt conveyors.

4. A modular cargo loading and unloading system as claimed in claim 3 wherein said perpendicular conveyors of said at least one doorway transfer unit includes three lateral belt conveyors located along one edge of said at least one doorway transfer unit and two spaced-apart, parallel longitudinal belt conveyors, one edge of one of said longitudinal belt conveyors lying along the edge of said lateral belt conveyors spaced inwardly from the edge of said doorway transfer unit along which said lateral belt conveyors are located.

5. A modular cargo loading and unloading system as claimed in claim 1 wherein said pair of spaced apart belt conveyors of said longitudinal units lie parallel to one another such that said conveyors have inner edges that face one another and outer edges that face away from one another and wherein each of said longitudinal units includes roller means located along the outer edges of said pair of spaced apart belt conveyors.

6. A modular cargo loading and unloading system as claimed in claim 5 wherein said perpendicular conveyors of said at least one doorway transfer unit includes three lateral belt conveyors located along one edge of said at least one doorway transfer unit and two spaced-apart, parallel longitudinal belt conveyors, one edge of one of said longitudinal belt conveyors lying along the edge of said lateral belt conveyors spaced inwardly from the edge of said doorway transfer unit along which said lateral belt conveyors are located.

7. A modular cargo loading and unloading system as claimed in claim 1 wherein said perpendicular conveyors of said at least one doorway transfer unit includes three lateral belt conveyors located along one edge of said at least one doorway transfer unit and two spaced-apart, parallel longitudinal belt conveyors, one edge of one of said longitudinal belt conveyors lying along the edge of said lateral belt conveyors spaced inwardly from the edge of said doorway transfer unit along which said lateral belt conveyors are located.

* * * * *

UNITED STATES PATENT AND TRADEMARK OFFICE
CERTIFICATE OF CORRECTION

PATENT NO. : 4,780,043

DATED : October 25, 1988

INVENTOR(S) : James A. Fenner et al.

It is certified that error appears in the above-identified patent and that said Letters Patent is hereby corrected as shown below:

Column 9, line 46, delete "an" and insert --and manual--

Column 9, line 49, after "moved;" insert --and,--

Signed and Sealed this

Thirtieth Day of May, 1989

Attest:

DONALD J. QUIGG

Attesting Officer

Commissioner of Patents and Trademarks